United States Patent Office 2,784,566
Patented Mar. 12, 1957

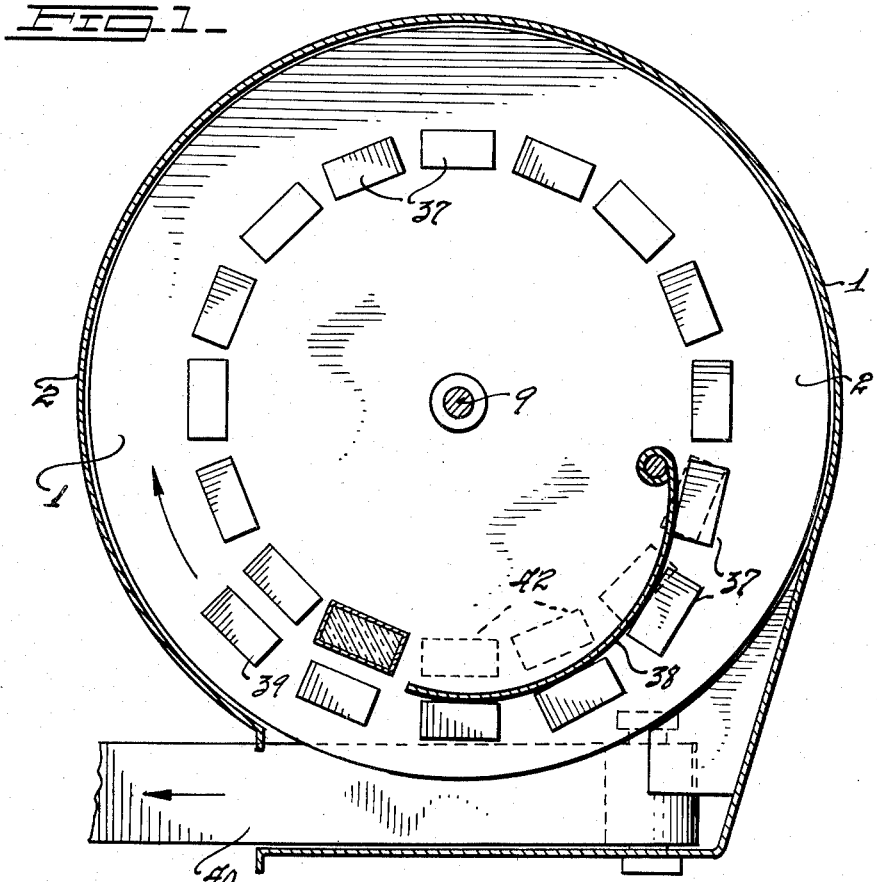
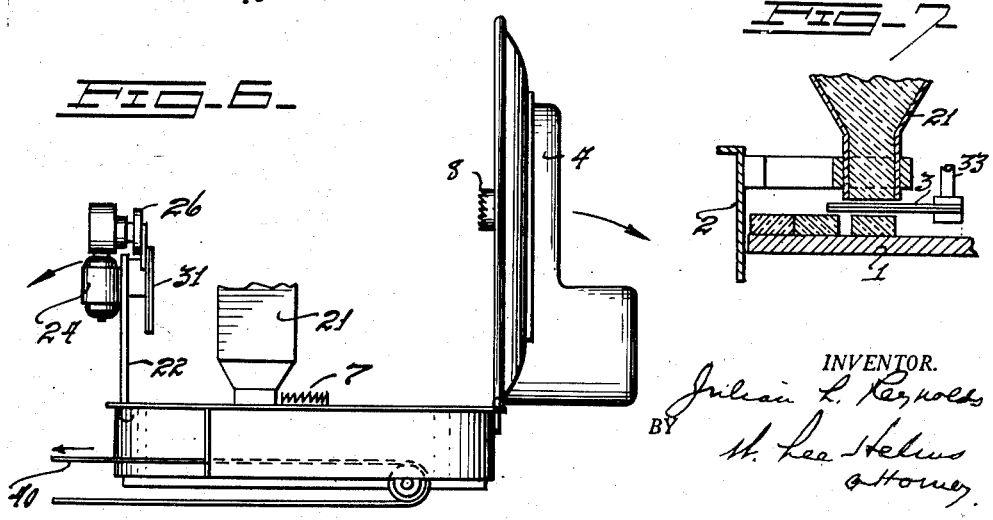

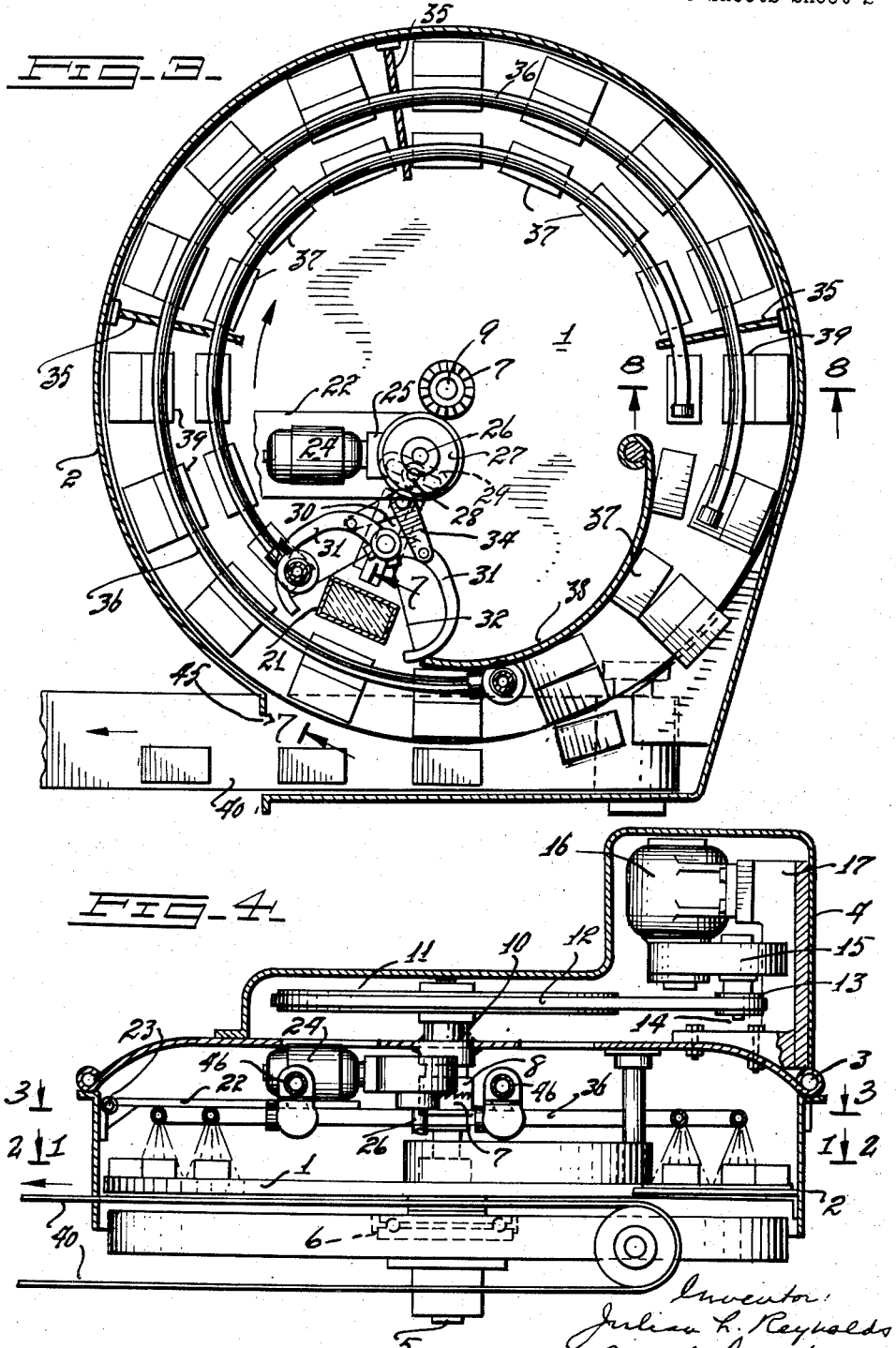

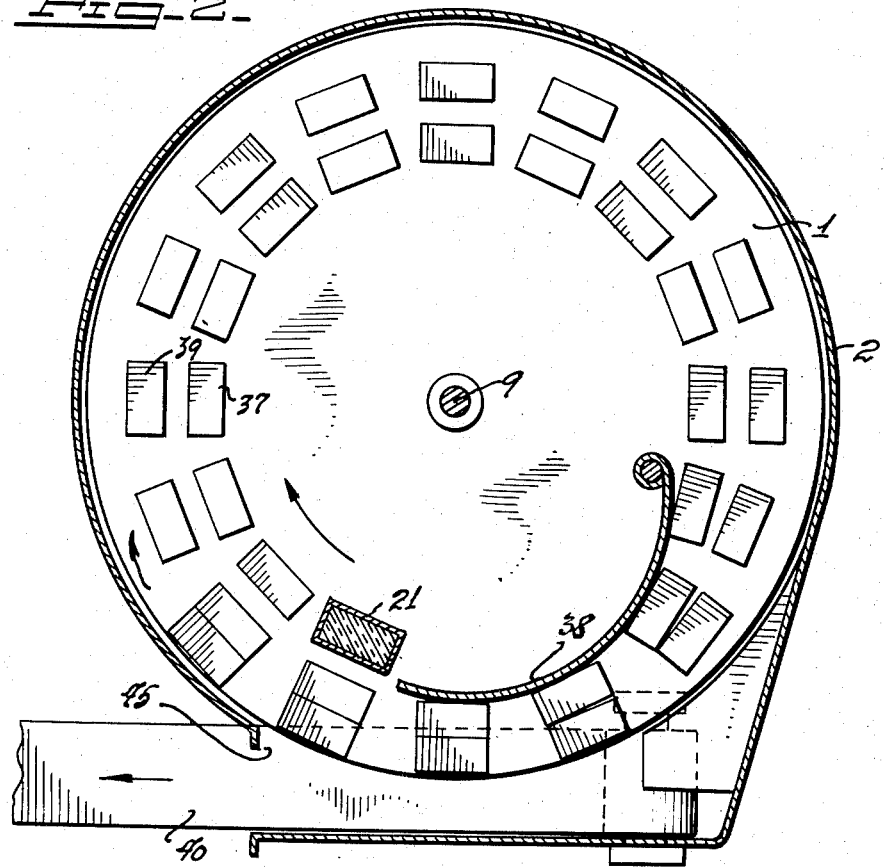
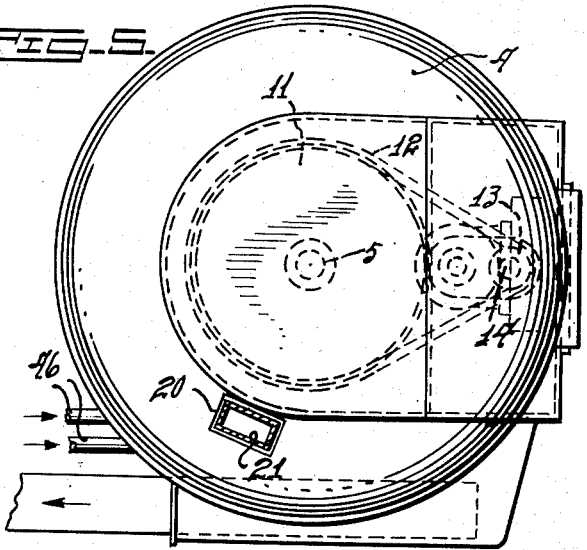
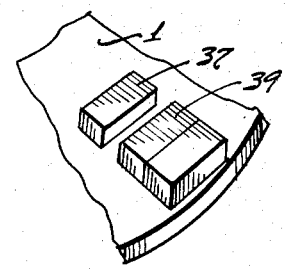

2,784,566

METHOD AND APPARATUS FOR MAKING FROZEN CONFECTIONS

Julian L. Reynolds, Richmond, Va.

Application July 14, 1954, Serial No. 443,231

8 Claims. (Cl. 62—114)

The object of the present invention is to provide a method and apparatus for very rapidly producing ice cream bars and allied frozen confections, including sherberts and water ices, under very low temperature refrigeration.

The invention is characterized in the present embodiment by the feeding of plastic ice cream or the like preferably in continuous movement from one or more continuous freezers to a point at which it is cut into bars and the bars deposited upon a turntable. The table can be rotated from the top or the bottom and it is enclosed within a casing which in practice will be provided with insulation, preferably cork, which does not absorb moisture. In the casing is a forming throat leading to the continuous supply of plastic ice cream or the like, and at the base of the forming throat is a cutter which cuts units from the downwardly flowing plastic material, these units dropping in succession onto the table as the latter revolves. The table and the bar-like units under refrigeration are subjected to sprays of liquid nitrogen or other low temperature non-toxic liquid refrigerant, and this refrigerant is gasified.

The heavy cold and dry gas within the casing is utilized to prevent building up of frost. For example, in operating at extremely low temperature, say —300 to —350° F. moisture content in the air builds up so fast, in the form of frost, as to make the operation impossible to function unless the frost build-up is definitely excluded, and under the present invention the casing is maintained with a sufficient volume of gas to exclude air.

The spray of liquid nitrogen or other liquid refrigerants of extremely low temperature not only absorb heat content of the ice cream or other food products by direct contact, almost immediately on the top portion and the sides and ends, but also it refrigerates the metal plate constituting the rotary table and which is in contact with the bottom of the product to be refrigerated.

Special means are to be provided for discharging the finally refrigerated product from the table.

The above and other objects of the invention will be described with reference to the accompanying drawings, in which:

Fig. 1 is a horizontal section through an apparatus embodiment showing the rotary table, the pusher shoe, the spiral movement of the units to be frozen, certain elements being shown in dotted lines, the section being on line 1—1, Fig. 4.

Fig. 2 is a view similar to Fig. 1, showing continuous progression of the units to be frozen, the section being on the line 2—2, Fig. 4.

Fig. 3 is a horizontal section on the line 3—3, Fig. 4.

Fig. 4 is a vertical section through the complete embodiment.

Fig. 5 is a top plan view partly in dotted lines.

Fig. 6 is a schematic elevation showing the cover raised.

Fig. 7 is a detailed vertical section on the line 7—7, Fig. 3.

Fig. 8 is a detailed view of the table and three units thereon to be frozen, in the positions shown at 8—8, Fig. 3.

Referring to the drawings as shown at 1 is a rotary table in a casing 2 which in practice will be insulated interiorly or exteriorly as desired. Pivoted at 3, Fig. 4, is a hollow cover 4 which also, in practice, will be insulated.

As seen more particularly in Fig. 4, table 1 is mounted on a shaft 5 and is supported by a bearing assembly 6; shaft 5 rises above the table and carries a clutch element 7. Normally above it when the method and apparatus undergoes operation is a co-acting clutch member 8 on a shaft 9 within spaced sleeve bearing 10 carried by the hollow cover 4 in any suitable manner as by a bracket support (not shown). Fixed to the shaft 9 is a pulley 11 connected by belt 12 to a drive pulley 13 on a shaft 14 driven by speed reduction gear (not shown) in a housing 15, motor drive 16 being provided therefor. All of these drive elements are supported by a bracket 17 carried by and within the hinged closure 4.

The hinged cover member 4 is formed with an opening at 20 for a forming throat 21 for a plastic confection mix and this forming throat in practice can be detached and drawn upwardly out of the hinged cover. Mounted upon a hinged carrier 22 secured to casing 2 at 23, Fig. 4, is a motor 24 which drives a reduction gearing (not shown) in a housing 25. This gearing drives a vertical shaft 26, Figs. 3 and 4, to which is fixed a drive disk 27. Eccentrically carried by the disk is a stud 28 which enters the elongated slot of a drive head 29 connected to a slide bar 30, Fig. 3. At 31 are shown opposed cutter arms, each carrying a cutter wire 32, these cutter arms being on fixed pivot 33 and the slide bar actuating the arms by means of the links 34.

Carried by brackets 35 leading inwardly from the housing 2 are two spray pipes 36 for the liquid refrigerant. At their lower surfaces these spray pipes may be provided with nozzles, or they may be perforated for the downward discharge of the liquid refrigerant.

In the operation of the said embodiment, the motors are thrown into action and the table revolves in the direction of the arrow thereon in Figs. 1, 2 and 3. This will bring on to the table a continuous spaced annular row of ice cream or other plastic bars, this row being indicated at 37. As the table revolves, the row 37 of the units under refrigeration is progressively moved outwardly by a fixed cam strip 38 to form a second outward row indicated at 39, Fig. 3. By such movement of the units one against the other as shown in Fig. 3, they are progressively pushed off the table and onto an endless belt 40, they being in final refrigerated condition.

In Fig. 2 the table is shown with the initial row 37 of units under refrigeration and the dotted lines at 42 show their progression in the absence of the fixed cam strip 38, the full lines showing how the cam strip pushes them out to form a second row 39. In Fig. 2, the row 39 extending from the far end of the cam strip 38 is shown as having pushed out succeeding units to form a third row, and in Fig. 3 the units of the third row are shown as having been pushed off onto the belt 40.

When it is desired to check, clean or repair the operating mechanism for the table, the hollow cover may be raised on its hinge, carrying with it all of the said table operating mechanism and exposing the table except for the cutter mechanism. Preliminary thereto, forming throat 21 will be detached and removed. If full access to the cutter mechanism and its operating means is desired the hinged carrier 22 may be raised to the position of Fig. 6.

When the hollow cover is closed the entire operating chamber is sealed except for the small opening at 45 for outlet passage of the completely frozen units carried by belt 40. Inasmuch as boiling off of refrigerant effects expansion into gas in great volume, which with liquid nitrogen is 600 times its initial volume, the chamber is excluded of air and hence frost is prevented. The construction is such that an insulation wall can be interposed between the refrigeration chamber and the hinged hollow cover through which wall the forming throat 21 may pass. Likewise the cutter mechanism, being independently carried by the casing above the spray pipe 36 may be provided with an immediately underlying insulation wall for protection against the extreme cold in the chamber below the said element.

The spray pipes may be fed from exterior the casing 2 by means of endless pipes 46, Fig. 5.

It will be understood that various modifications may be made in the form and arrangement of the elements constituting the apparatus of the invention, without departing from the spirit of the invention.

The method and apparatus is adapted for freezing foodstuffs in containers or packages, and therefore the forming throat may be substituted for means more particularly adapted for depositing such containers or packages upon the table or equivalent carrier.

Having described my invention, what I claim and desire to secure by Letters Patent is as follows:

1. In apparatus for freezing food units, a rotary table, means for depositing successive food units upon the surface of said table whereby an initial annular row of mutually spaced units lies upon the table, means for deflecting said units at the end area of said row whilst adding corresponding units to the fore area of said annular row successively toward the periphery of the table until they are discharged in frozen state, and means for subjecting the said surface directly to the action of a fluid refrigerant.

2. Apparatus constructed in accordance with claim 1 in combination with means for enveloping said units and the table therefor in a dense gaseous atmosphere substantially excluding air, and which consists of a closed chamber for the table, and means for substantially confining within the chamber an atmosphere of cold gas created within the chamber by evaporation of said fluid refrigerant.

3. In apparatus for freezing food units, a rotary table, means for depositing successive food units upon the surface of the table whereby an initial annular row of units lies on the table, spray pipes above the table, and means for leading thereto a highly volatile non-toxic fluid refrigerant, and means toward the periphery of the table for moving successive units toward and off the periphery of the table, said last means consisting of at least one cam deflector against the surface of which the units are progressively brought.

4. In apparatus for freezing food units, a rotary table, means for depositing successive food units upon the surface of said table whereby an initial annular row of mutually spaced units lies upon the table, means for deflecting said units successively toward the periphery of the table, said deflecting means being adapted for discharge of the units in frozen state at the periphery through pressure upon said peripheral units exerted by succeeding and axially inwardly located units, and means for subjecting said surface directly to the action of a fluid refrigerant.

5. In apparatus for freezing food units, a rotary table, means for depositing successive food units upon the surface of said table whereby an initial annular row of units lies upon the table, a casing surrounding the table, a clutch carried by the table axially thereof, a hinged hollow cover applied to the top of the casing, a drive shaft carried within said cover, a clutch carried by the shaft and adapted to engage and rotate the first named clutch, means within the hollow cover for rotating said shaft, and means in the casing for subjecting the table to the action of said liquid refrigerant.

6. In apparatus for freezing food units, a rotary table, means for depositing successive food units upon the surface of said table whereby an initial annular row of units lies upon the table, a casing surrounding the table, a clutch carried by the table axially thereof, a hinged hollow cover applied to the top of the casing, a drive shaft carried within said cover, a clutch carried by the shaft and adapted to engage and rotate the first named clutch, means within the hollow cover for rotating said shaft, means for feeding a highly volatile liquid refrigerant within the casing, and spray means for said liquid refrigerant within the casing and adapted to spray the refrigerant both onto the table and onto food units supported thereby.

7. In apparatus for freezing food units, a rotary table, means for depositing successive food units upon the surface of said table whereby an initial annular row of units lies upon the table, said depositing means consisting of a forming throat for plastic food mix such as ice cream, a bracket support hinged to the casing, a cutter for successively cutting off plastic sections from the plastic moving downwardly from said throat, and a motor drive for said cutting means, said cutting means and drive means mounted on said hinged support, a casing enclosing the table, a hinged hollow cover carried by the casing, clutch means carried by the table, a shaft with coacting clutch means carried by the hinged cover, and power means within the hinged cover for driving said coacting clutch, as and for the purpose set forth.

8. A method of freezing plastic edible ice cream and the like which comprises depositing successive unenclosed and exposed units thereof upon a continuously rotating table surface of high heat conduction so that in the rotation of the table the units progressively form an initial annular row, subjecting said edible units directly to a highly volatile, non-toxic, liquid refrigerant, deflecting said units at the end area of said row while adding corresponding units to the fore area of said annular row, successively toward the periphery of the table, and finally discharging successive units from said table.

References Cited in the file of this patent

UNITED STATES PATENTS

| | | |
|---|---|---|
| 599,534 | Schorke | Feb. 22, 1898 |
| 1,414,727 | Edmands | May 2, 1922 |
| 2,200,331 | Fisher | May 14, 1940 |
| 2,229,000 | Birdseye | Jan. 14, 1941 |
| 2,253,383 | Lloyd | Aug. 19, 1941 |
| 2,261,808 | Morris | Nov. 4, 1941 |
| 2,332,367 | Birdseye | Oct. 19, 1943 |
| 2,475,573 | Smith | July 5, 1949 |
| 2,573,725 | Polk | Nov. 6, 1951 |
| 2,625,120 | Eddy | Jan. 13, 1953 |
| 2,642,173 | Wehmiller | June 16, 1953 |
| 2,700,347 | Gram | Jan. 25, 1955 |

FOREIGN PATENTS

| | | |
|---|---|---|
| 222,868 | Switzerland | Nov. 2, 1942 |
| 814,908 | Germany | Sept. 27, 1951 |
| 876,181 | France | Oct. 29, 1942 |